(12) United States Patent
Varela et al.

(10) Patent No.: US 9,096,259 B2
(45) Date of Patent: Aug. 4, 2015

(54) STEERING KNUCKLE ASSEMBLY WITH SNAP RING SPINDLE RETENTION AND A METHOD OF MANUFACTURE

(75) Inventors: Tomaz Dopico Varela, Shelby Township, MI (US); Dale Eschenburg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 74 days.

(21) Appl. No.: 13/561,180

(22) Filed: Jul. 30, 2012

(65) Prior Publication Data

US 2014/0027994 A1 Jan. 30, 2014

(51) Int. Cl.
*B62D 7/18* (2006.01)
*B23P 11/02* (2006.01)

(52) U.S. Cl.
CPC ............. *B62D 7/18* (2013.01); *Y10T 29/49876* (2015.01)

(58) Field of Classification Search
CPC . B62D 7/18; B60G 2206/50; Y10T 29/49876
USPC ........................................ 280/93.512; 29/453
See application file for complete search history.

(56) References Cited

U.S. PATENT DOCUMENTS

| | | | | |
|---|---|---|---|---|
| 3,232,088 A * | 2/1966 | Newcomer, Jr. et al. | ........ | 72/377 |
| 3,326,580 A * | 6/1967 | Munier et al. | ................... | 285/27 |
| 3,801,124 A * | 4/1974 | Afanador et al. | ........ | 280/93.512 |
| 3,852,872 A * | 12/1974 | Afanador et al. | ................ | 29/447 |
| 3,908,480 A * | 9/1975 | Afanador et al. | ............ | 74/511 R |
| 4,565,392 A * | 1/1986 | Vyse | ................................ | 285/23 |
| 5,494,129 A * | 2/1996 | Krude et al. | ................... | 180/256 |
| 5,651,303 A * | 7/1997 | Fish | ................................. | 92/128 |
| 6,079,512 A * | 6/2000 | Krisher | ......................... | 180/259 |
| 6,419,250 B1 | 7/2002 | Pollock et al. | | |
| 6,565,159 B1 * | 5/2003 | Kosak | ............................ | 301/132 |
| 6,641,229 B1 * | 11/2003 | Kosak | ............................ | 301/132 |
| 6,739,422 B2 * | 5/2004 | Krude et al. | ................... | 180/256 |
| 6,902,176 B2 * | 6/2005 | Gottschalk | ............... | 280/93.512 |
| 6,916,030 B2 * | 7/2005 | Cai | ............................ | 280/93.512 |
| 8,459,671 B2 * | 6/2013 | Kuwabara et al. | ........ | 280/93.512 |
| 8,469,378 B1 * | 6/2013 | Bodary et al. | ............ | 280/93.512 |
| 8,573,615 B2 * | 11/2013 | Kuwabara et al. | ........ | 280/93.512 |
| 8,777,241 B1 * | 7/2014 | Hamernik | ................ | 280/93.512 |
| 2003/0222422 A1 | 12/2003 | Barila | | |
| 2006/0186627 A1 * | 8/2006 | Koyagi et al. | ............ | 280/93.512 |
| 2010/0025951 A1 * | 2/2010 | Buchwald et al. | ........ | 280/93.512 |
| 2010/0119186 A1 * | 5/2010 | Fukumura et al. | ............ | 384/544 |

FOREIGN PATENT DOCUMENTS

| | | |
|---|---|---|
| CN | 1524046 A | 8/2004 |
| CN | 201882147 U | 6/2011 |
| EP | 0615893 A1 | 9/1994 |
| JP | 2005256938 A | 9/2005 |

OTHER PUBLICATIONS

Chinese Search Report for CN Application No. 201310182118.6, dated Jun. 3, 2015, 10 pages.

* cited by examiner

*Primary Examiner* — Paul N Dickson
*Assistant Examiner* — Joselynn Y Sliteris
(74) *Attorney, Agent, or Firm* — Brooks Kushman P.C.

(57) ABSTRACT

A steering knuckle assembly and a method of manufacture. The steering knuckle assembly may include a steering knuckle, a spindle, and a snap ring. The snap ring may be disposed in snap ring grooves in the steering knuckle and spindle to inhibit movement of the spindle with respect to the steering knuckle.

20 Claims, 4 Drawing Sheets

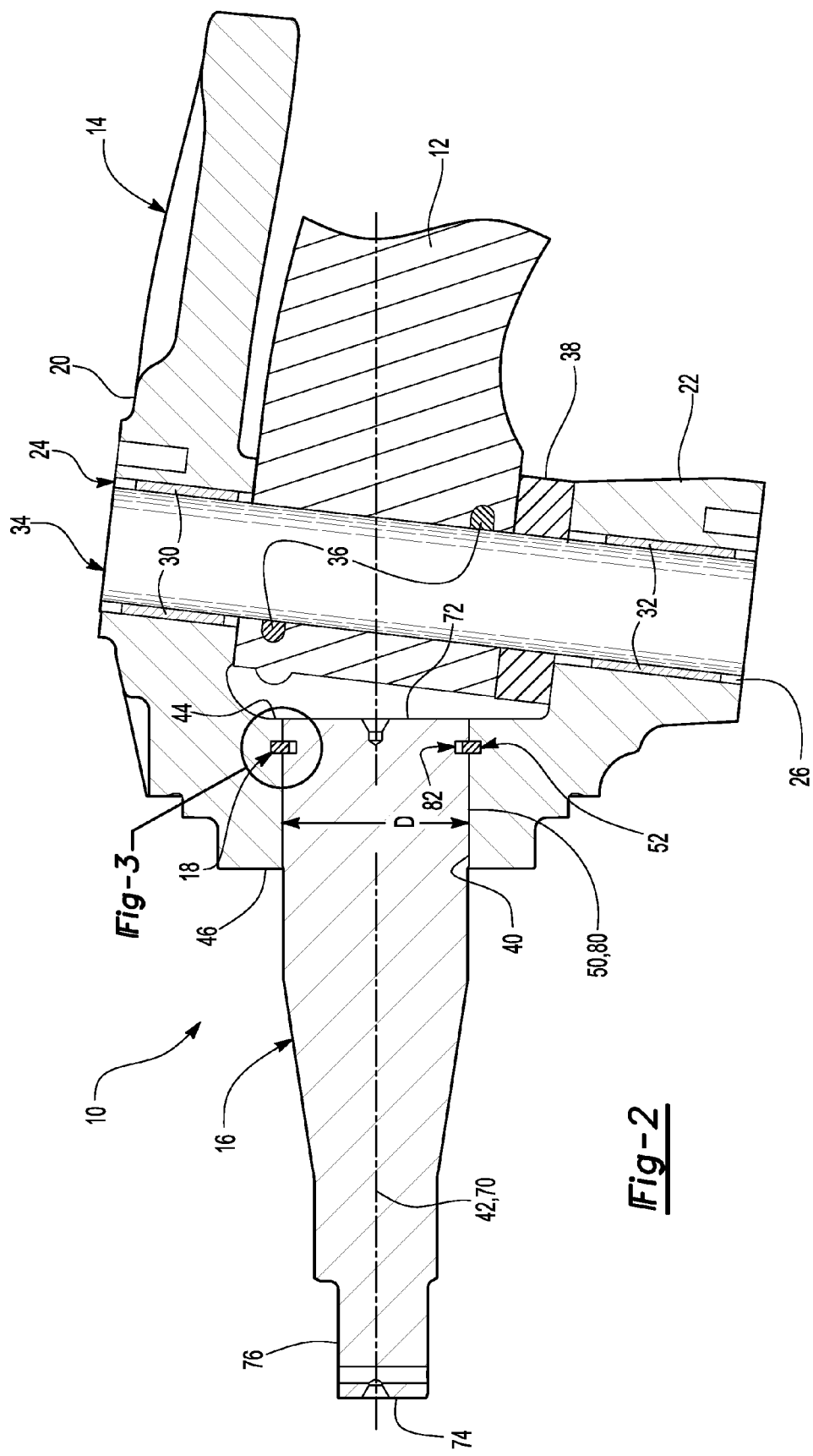

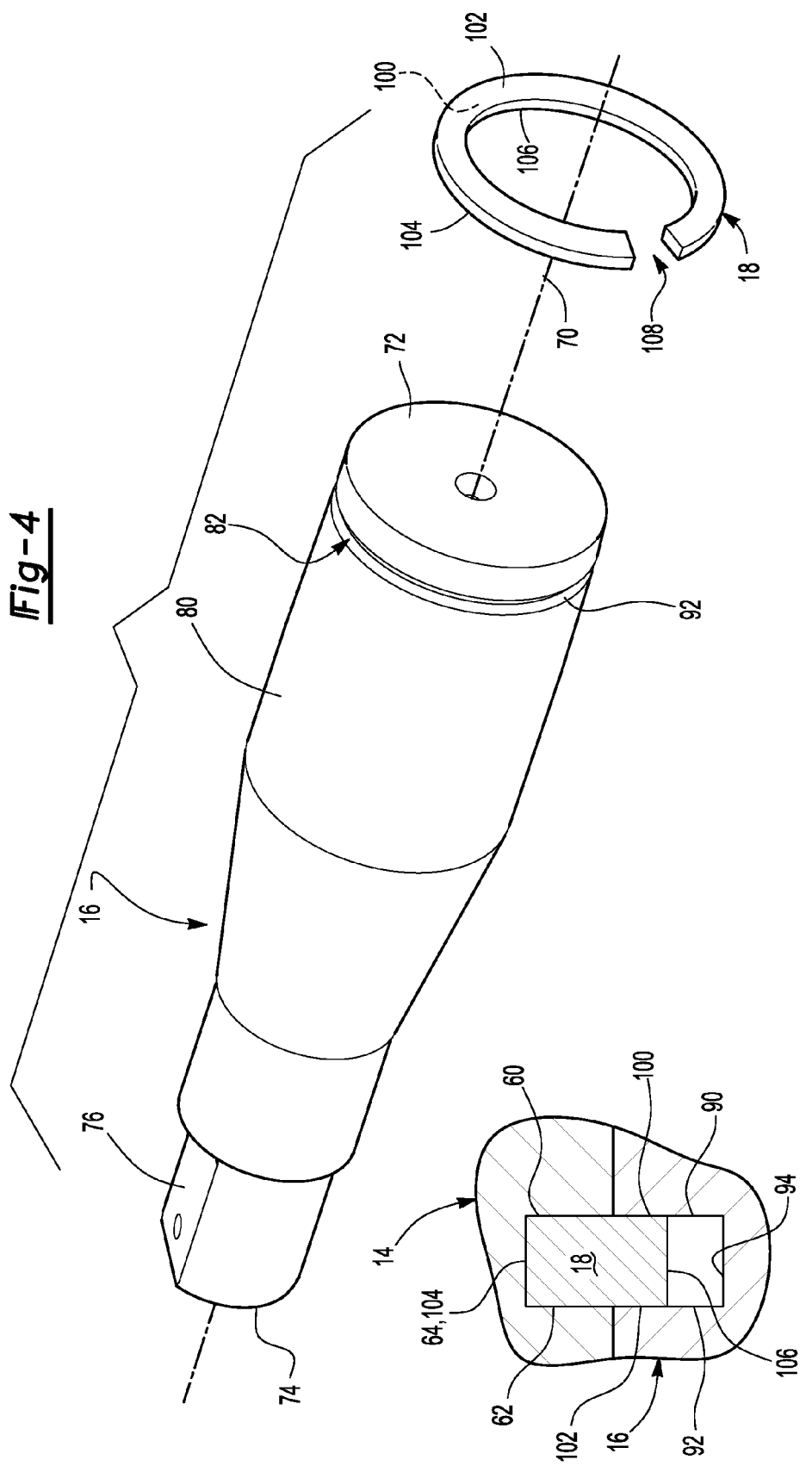

US 9,096,259 B2

STEERING KNUCKLE ASSEMBLY WITH SNAP RING SPINDLE RETENTION AND A METHOD OF MANUFACTURE

TECHNICAL FIELD

The present application relates to a steering knuckle assembly for a vehicle and a method of manufacture.

BACKGROUND

A steering knuckle assembly is disclosed in U.S. Pat. No. 6,419,250.

SUMMARY

In at least one embodiment, a steering knuckle assembly is provided. The steering knuckle assembly may have a steering knuckle, a spindle, and a snap ring. The steering knuckle may have a hole and a knuckle snap ring groove disposed in the hole. The spindle may be disposed in the hole and may have a spindle circumferential surface and a spindle snap ring groove that extends from the spindle circumferential surface. The snap ring may be disposed in the knuckle snap ring groove and the spindle snap ring groove to inhibit movement of the spindle with respect to the steering knuckle.

In at least one embodiment, a steering knuckle assembly may be provided. The steering knuckle assembly may have a steering knuckle, a spindle, and a snap ring. The steering knuckle may have a circumferential surface that defines a hole and a knuckle snap ring groove that is disposed in the hole and extends from the circumferential surface. The spindle may extend through the hole and may have a spindle circumferential surface and a spindle snap ring groove that extends from the spindle circumferential surface and is aligned with the knuckle snap ring groove. The snap ring may be disposed in the knuckle snap ring groove and the spindle snap ring groove and may engage the steering knuckle and the snap ring to fixedly position the spindle.

In at least one embodiment, a method of making a steering knuckle assembly is provided. A steering knuckle may be provided that may have a hole and a knuckle snap ring groove disposed in the hole. A spindle may be provided that may have a spindle circumferential surface and a spindle snap ring groove that extends from the spindle circumferential surface. A snap ring may be positioned in the spindle snap ring groove. The spindle and snap ring may be inserted into the hole in the steering knuckle such that the snap ring is aligned with the knuckle snap ring groove, thereby allowing the snap ring to expand into the snap ring groove to inhibit axial movement of the spindle.

BRIEF DESCRIPTION OF THE DRAWINGS

FIG. 2 is a side section view of the steering knuckle assembly coupled to an axle beam.

FIG. 3 is a magnified view of a portion of FIG. 2.

FIG. 4 is an exploded view of a spindle and a snap ring that may be provided with the steering knuckle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
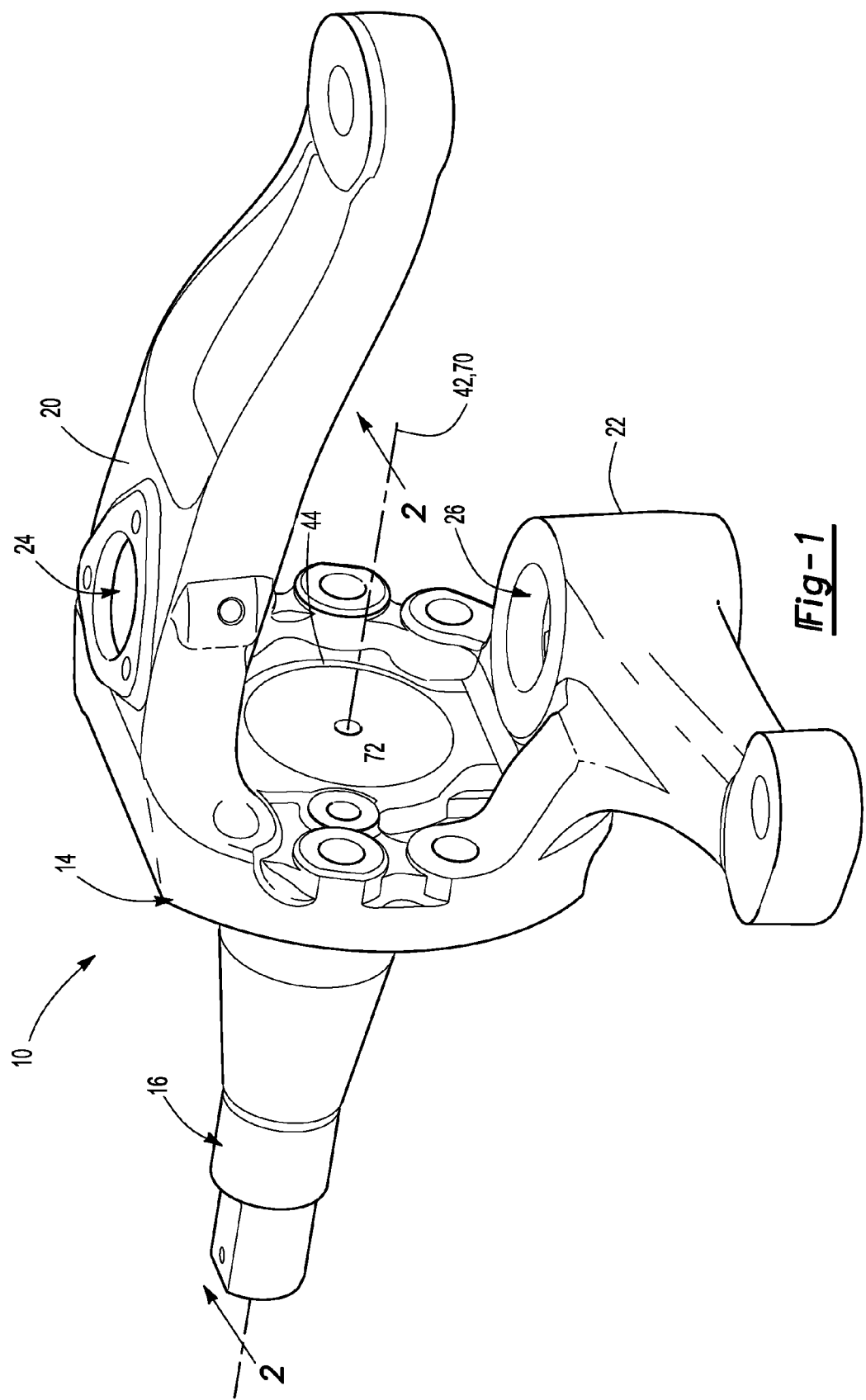
FIG. 1 is a perspective view of an exemplary steering knuckle assembly.

Referring to FIGS. 1 and 2, an exemplary steering knuckle assembly 10 is shown. The steering knuckle assembly 10 may be provided with a motor vehicle, such as a truck, bus, farm equipment, military transport or weaponry vehicle, or cargo loading equipment for land, air, or marine vessels. The steering knuckle assembly 10 may be coupled to an axle beam 12 and may be part of a steering system that may steer or change the direction of travel of the vehicle. In at least one embodiment, the steering knuckle assembly 10 may include a steering knuckle 14, a spindle 16, and a snap ring 18.

The steering knuckle 14 may include first and second arms 20, 22 that may include first and second holes 24, 26, respectively. The first and second holes 24, 26 may be coaxially aligned. As is best shown in FIG. 2, the first and second holes 24, 26 may receive first and second bushings 30, 32, respectively, and a kingpin 34.

The kingpin 34 may couple the steering knuckle 14 to the axle beam 12 such that the steering knuckle 14 may pivot about the kingpin 34. More specifically, the kingpin 34 may extend through a hole in the axle beam 12 such that opposing ends of the kingpin 34 may be received in the first and second bushings 30, 32.

One or more fasteners may be provided to secure the kingpin 34 to the axle beam 12. For example, a pair of draw keys 36 may extend through openings in the axle beam 12 and may engage the kingpin 34 to fixedly position the kingpin 34 with respect to the axle beam 12.

A thrust bearing 38 may be provided between the axle beam 12 and the second arm 22 of the steering knuckle 14. The thrust bearing 38 may extend around the kingpin 34 and may facilitate pivotal movement of the steering knuckle 14.

Figure 5:
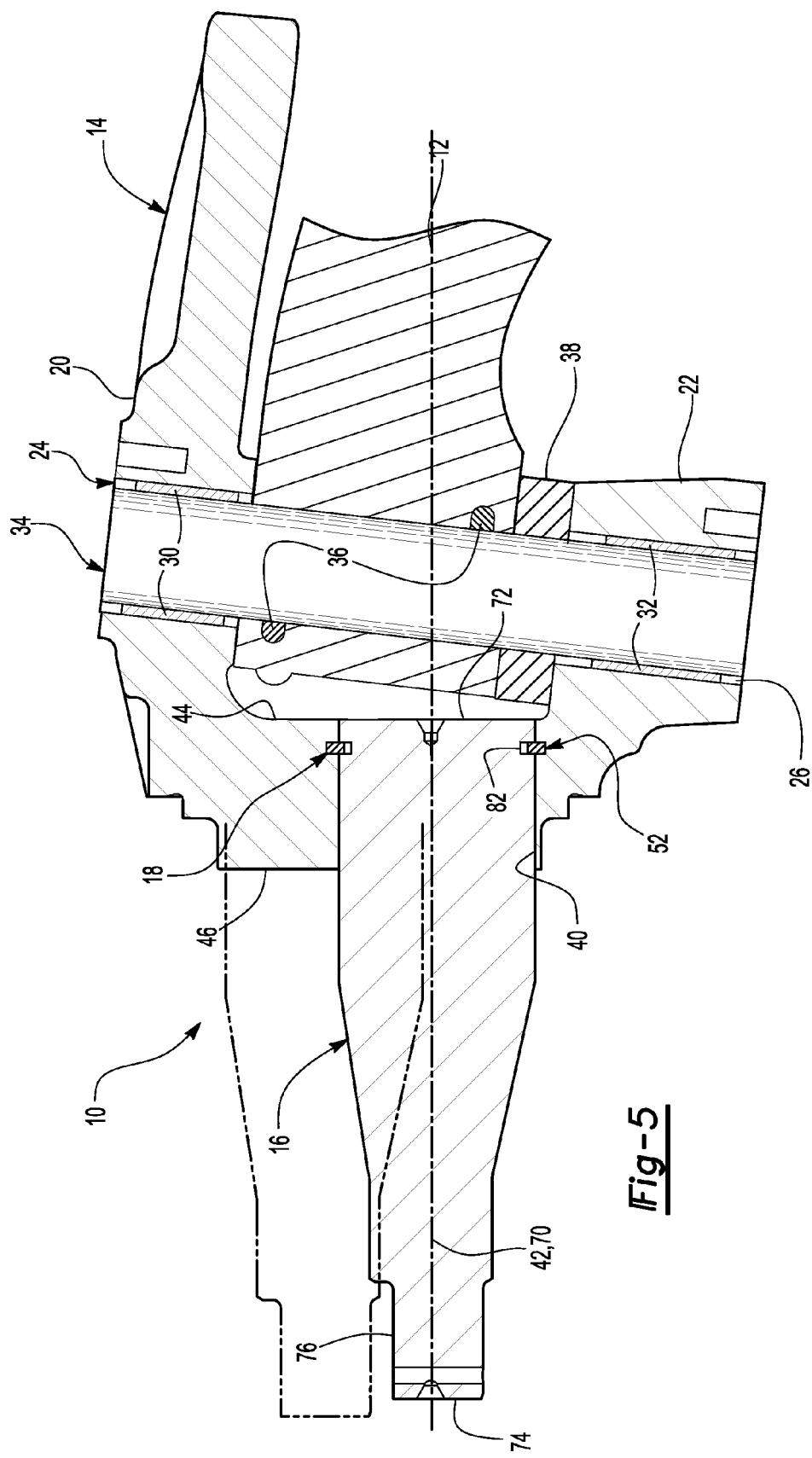
FIG. 5 is a side section view of a steering knuckle assembly illustrating different exemplary spindle positions.

The steering knuckle 14 may also include a hole 40 that may be disposed along a center axis 42. The hole 40 may be a through hole that may extend from a first side 44 of the steering knuckle 14 to a second side 46 that may be disposed opposite the first side 44. The hole 40 may be located between the first and second arms 20, 22 in various positions. For instance, the hole 40 may be moved up or down from the position shown in FIGS. 1 and 2 to provide different spindle positions. For example, the hole 40 and spindle 16 may be moved down from the position shown in FIG. 1 as is shown in solid lines in FIG. 5 or up from the position shown in FIG. 1 as is shown in phantom in FIG. 5. In addition, the hole 40 and spindle 16 may be positioned at various intermediate positions between the positions shown in FIG. 5. Such vertical positioning or offset capability may allow multiple spindle positions or multiple axle drop options to be provided with a common steering knuckle casting. As such, steering knuckle 14 may be provided with offset bosses that may facilitate improved brake disc packaging.

The steering knuckle 14 may include a surface 50 may at least partially define the hole 40. The surface 50 may be a circumferential surface that may be radially disposed about the center axis 42 and may have a diameter D. In at least one embodiment, the surface 50 may extend from the first side 44 to the second side 46. In addition, the surface 50 may be substantially smooth.

Referring to FIGS. 2 and 3, a knuckle snap ring groove 52 may be disposed in the hole 40 between the first and second sides 44, 46. The knuckle snap ring groove 52 may extend from the surface 50 in a direction that extends away from the center axis 42. As is best shown in FIG. 2, the knuckle snap ring groove 52 may include a first surface 60, a second surface 62, and a third surface 64 that may cooperate to at least partially define the knuckle snap ring groove 52. The first and second surfaces 60, 62 may be spaced apart from each other and may extend radially or substantially perpendicular with respect to the center axis 42. The third surface 64 may extend from the first surface 60 to the second surface 62 and may have diameter that is greater than the diameter D of the hole 40. As such, the surface 50 and third surface 64 may be concentrically disposed about the center axis 42.

Referring to FIGS. 2 and 4, the spindle 16 may extend from the steering knuckle 14 and may support a wheel hub assembly that facilitates mounting and rotation of a vehicle wheel. More specifically, the spindle 16 may extend away from the axle beam 12 and may support one or more wheel bearings that support and facilitate rotation of a vehicle wheel. The spindle 16 may be made of any suitable material, such as a metal or metal alloy like steel. In addition, the spindle 16 may be machined from bar stock rather than forged, which may reduce manufacturing costs. The spindle 16 may extend along a center axis 70 from a first end 72 to a second end 74 of the spindle 16. The second end 74 may be disposed opposite the first end 72 and may have a flat surface 76. The flat surface 76 may be disposed above the center axis 70 and may be disposed in a substantially horizontal plane. In addition, the spindle 16 may include an exterior surface 80.

The surface 80 may be radially disposed about the center axis 70 and may be referred to as a spindle circumferential surface or a circumferential surface of the spindle 16. In at least one embodiment, the surface 80 may extend from the first end 72 partially toward the second end 74. As such, the surface 80 may extend to or extend past the second side 46 of the steering knuckle 14. The surface 80 may continuously engage the surface 50 of the steering knuckle 14 with an interference fit, thereby increasing retention force and increasing bending resistance of the spindle 16 as will be discussed in more detail below. The surface 80 may be substantially smooth in one or more embodiments.

Referring to FIGS. 2-4, the spindle 16 may also have a spindle snap ring groove 82. The spindle snap ring groove 82 may be disposed between the first and second ends 72, 74 and may extend from the surface 80 in a direction that extends toward the center axis 70. As is best shown in FIG. 2, the spindle snap ring groove 82 may include a first surface 90, a second surface 92, and a third surface 94 that may cooperate to at least partially define the spindle snap ring groove 82. The first and second surfaces 90, 92 may be spaced apart from each other and extend radially or substantially perpendicular with respect to the center axis 70. The third surface 94 may extend from the first surface 90 to the second surface 92 and may have diameter that is less than the diameter D of the hole 40. As such, the surface 80 and third surface 94 may be concentrically disposed about the center axis 70.

The snap ring 18 may be provided to inhibit movement of the spindle 16 with respect to the steering knuckle 14. More specifically, the snap ring 18 may be received in the knuckle snap ring groove 52 and the spindle snap ring groove 82 to inhibit axial movement of the spindle 16, or inhibit the spindle 16 from being pulled through the hole 40. In at least one embodiment, the snap ring 18 may have a first snap ring surface 100, a second snap ring surface 102, an outer surface 104, and an inner surface 106. A gap 108 may be provided between opposing free ends of the snap ring 18 facilitate flexing of the snap ring from a nominal position to a flexed or compressed position in which the free ends may be positioned closer together to reduce the exterior dimensions of the snap ring 18.

The first and second snap ring surfaces 100, 102 may be disposed opposite each other. The first snap ring surface 100 may engage the first surface 60 of the knuckle snap ring groove 52 and/or the first surface 90 of the spindle snap ring groove 82.

The second snap ring surface 102 may be disposed substantially parallel to the first snap ring surface 100 and may engage the second surface 62 of the knuckle snap ring groove 52 and/or the second surface 92 of the spindle snap ring groove 82.

The outer and inner surfaces 104, 106 may be disposed opposite each other and may extend from the first snap ring surface 100 to the second snap ring surface 102. The outer surface 104 may be disposed proximate the third surface 64 of the knuckle snap ring groove 52. Moreover, the outer surface 104 may have a larger diameter than the diameter D of the hole 40 when the snap ring 18 is in a nominal position or uncompressed condition. The inner surface 106 may be disposed proximate the third surface 94 of the spindle snap ring groove 82. Moreover, the inner surface 106 may have a larger diameter than the spindle snap ring groove 82 to allow the snap ring 18 to flex or be squeezed and compressed from its nominal position toward the third surface 94 to facilitate installation of the spindle 16 and snap ring 18 as will be discussed in more detail below.

Various methods of making or assembling a steering knuckle assembly 10 will now be described in more detail.

As previously discussed, the spindle 16 may be provided in multiple positions based on the position of the hole 40 in the steering knuckle 14. As such, multiple steering knuckle assembly 10 configurations may be provided by altering the location of the hole 40 on a standardized or partially standardized steering knuckle 14 design. For example, a desired spindle position may be selected and a steering knuckle 14 may be provided and with a hole in the desired spindle position. The spindle position may be selected from a set of potential spindle positions that may be located between the first and second arms 20, 22. Next, the hole 40 may be provided at a location that corresponds with the desired or selected spindle position. For instance, the hole 40 may be formed with the hole 40 in the desired location and/or material may be removed from the steering knuckle 14 to form the hole 40, such as by drilling. After the hole 40 is provided, the knuckle snap ring groove 52 may be machined into the hole 40.

The snap ring 18 may be positioned on the spindle 16 in the spindle snap ring groove 82. The spindle 16 may be aligned with the hole 40 in the steering knuckle 14. Then, the spindle 16 and snap ring 18 may be inserted into the hole 40 and moved axially or along the center axis 42 until the spindle snap ring groove 82 is aligned with the knuckle snap ring groove 52. The snap ring 18 may expand into the knuckle snap ring groove 52 when the knuckle and spindle snap ring grooves 52, 82 are aligned. As such, the snap ring 18 may engage one or more surfaces that define the knuckle and spindle snap ring grooves 52, 82 to inhibit axial movement of the spindle 16.

The snap ring 18 may be flexed from its nominal position to or toward a compressed position during assembly to reduce the outside diameter of the snap ring 18. For instance, the snap ring 18 may be compressed from its nominal position prior to and/or during insertion into the hole 40. Moreover, the snap ring 18 may remain compressed before the spindle snap ring groove 82 is aligned with the knuckle snap ring groove 52 due to engagement of the outer surface 104 of the snap ring 18 and the surface 50 of the hole 40. The snap ring 18 may expand toward the nominal position when the outer surface 104 does not engage the surface 50 (e.g., when the knuckle and spindle snap ring grooves 52, 82 are aligned). After expansion, at least a portion of the inner surface 106 of the snap ring 18 may be spaced apart from the third surface 94 in one or more embodiments.

The steering knuckle 14 may be heated to increase a diameter of the hole 40 and/or the spindle 16 may be cooled to reduce a diameter of the spindle 16 at surface 80 before the spindle 16 and snap ring 18 are inserted into the hole 40. As such, a temporary clearance fit may be provided between the spindle 16 and the steering knuckle 14 to facilitate assembly. An interference fit or engagement of surfaces 50 and 80 may help increase the bending resistance of the spindle 16. More specifically, engagement of surface 50 of the steering knuckle 14 against surface 80 of the spindle 16 may increase the contact distance between the spindle 16 and the steering knuckle 14 and increase the bending resistance of the spindle 16 with respect to its center axis 70. In addition, an interference fit may increase the shear resistance of the spindle 16. More specifically, the interference fit may add to the shear resistance provided by the snap ring 18, which acts as a mechanical stop by engaging one or more surfaces that define the knuckle and spindle snap ring grooves 52, 82 to inhibit axial movement of the spindle 16 through the hole 40.

The steering knuckle assembly 10 may be configured to permanently couple the steering knuckle 14 and spindle 16 in one or more embodiments. For example, the steering knuckle 14 may not be provided with any access holes that would allow external access to the snap ring 18 to compress of the snap ring 18 out of the knuckle snap ring groove 52 in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering knuckle assembly comprising:
   a steering knuckle having an inner surface that defines a hole and a knuckle snap ring groove disposed in the hole;
   a spindle that is disposed in the hole and has a spindle circumferential surface and a spindle snap ring groove that extends from the spindle circumferential surface; and
   a snap ring that is disposed in the knuckle snap ring groove and the spindle snap ring groove to inhibit movement of the spindle with respect to the steering knuckle, wherein the spindle circumferential surface engages the inner surface with an interference fit such that the spindle is fixedly positioned in the hole with respect to the steering knuckle.

2. The steering knuckle assembly of claim 1 wherein the steering knuckle has a circumferential surface that at least partially defines the hole.

3. The steering knuckle assembly of claim 2 wherein the hole extends along a center axis and the circumferential surface is radially disposed about the center axis.

4. The steering knuckle assembly of claim 2 wherein the circumferential surface engages the spindle circumferential surface.

5. The steering knuckle assembly of claim 1 wherein the spindle extends along a center axis and the spindle snap ring groove extends from the spindle circumferential surface toward the center axis.

6. The steering knuckle assembly of claim 5 wherein the snap ring engages the spindle and the steering knuckle to inhibit axial movement of the spindle along the center axis.

7. A steering knuckle assembly comprising:
   a steering knuckle having a circumferential surface that defines a hole and a knuckle snap ring groove that is disposed in the hole and extends from the circumferential surface;
   a spindle that extends along a center axis through the hole, the spindle having a first end, a second end disposed opposite the first end, a spindle circumferential surface, and a spindle snap ring groove that extends from the spindle circumferential surface and is aligned with the knuckle snap ring groove, wherein the spindle extends along the center axis from the first end to the second end and the spindle circumferential surface engages the circumferential surface with an interference fit; and
   a snap ring that is disposed in the knuckle snap ring groove and the spindle snap ring groove, wherein the snap ring engages the steering knuckle and the spindle to fixedly position the spindle in the hole.

8. The steering knuckle assembly of claim 7 wherein the spindle snap ring groove is disposed closer to the first end than the second end.

9. The steering knuckle assembly of claim 7 wherein the knuckle snap ring groove includes a first surface and a second surface disposed opposite the first surface, wherein the snap ring engages the first and second surfaces to inhibit axial movement of the spindle.

10. The steering knuckle assembly of claim 7 wherein the spindle snap ring groove includes a first surface and a second surface disposed opposite the first surface, wherein the snap ring engages the first and second surfaces to inhibit axial movement of the spindle.

11. The steering knuckle assembly of claim 7 wherein the spindle and the hole extend along the center axis, wherein the knuckle snap ring groove extends radially away from the center axis and the spindle snap ring groove extends radially toward the center axis.

12. The steering knuckle assembly of claim 7 wherein the spindle circumferential surface is in continuous engagement with the circumferential surface.

13. The steering knuckle assembly of claim 7 further comprising an axle beam that is mounted to the steering knuckle.

14. A method of making a steering knuckle assembly comprising:
   providing a steering knuckle having a hole and a knuckle snap ring groove disposed in the hole;
   providing a spindle having a spindle circumferential surface and a spindle snap ring groove that extends from the spindle circumferential surface;
   positioning a snap ring in the spindle snap ring groove; and
   inserting the spindle and snap ring into the hole in the steering knuckle such that the snap ring is aligned with the knuckle snap ring groove, thereby allowing the snap ring to expand into the knuckle snap ring groove to inhibit axial movement of the spindle.

15. The method of claim 14 further comprising a step of squeezing the snap ring toward the spindle before inserting the snap ring into the hole.

16. The method of claim 14 further comprising a step of heating the steering knuckle to increase a diameter of the hole before inserting the spindle and snap ring into the hole.

17. The method of claim 14 further comprising a step of cooling the spindle to reduce a diameter of the spindle circumferential surface before inserting the spindle and snap ring into the hole.

18. The method of claim 14 further comprising heating the steering knuckle to increase a diameter of the hole and cooling the spindle to reduce a diameter of the spindle circumferential surface before inserting the spindle and snap ring into the hole.

19. The method of claim 14 wherein the steering knuckle has a circumferential surface that defines the hole and wherein the snap ring engages the circumferential surface when the spindle is inserted into the hole.

20. The method of claim 14 wherein the steering knuckle includes a first arm and a second arm and step of providing a steering knuckle further comprises:

selecting a desired spindle position between the first and second arms from a set of spindle positions;

providing the hole at the desired spindle position; and providing the knuckle snap ring groove disposed in the hole.

\* \* \* \* \*